United States Patent [19]

Kisiel

[11] Patent Number: 4,497,344

[45] Date of Patent: Feb. 5, 1985

[54] FRANGIBLE VALVE STEM ASSEMBLY FOR ROTARY VALVE

[75] Inventor: Stanley C. Kisiel, Bradford, Pa.

[73] Assignee: Dresser Industries, Inc., Dallas, Tex.

[21] Appl. No.: 447,063

[22] Filed: Dec. 6, 1982

[51] Int. Cl.³ .............................................. F16K 13/04
[52] U.S. Cl. .................................. 137/797; 137/368; 251/292
[58] Field of Search ................. 137/368, 797; 251/292

[56] References Cited

U.S. PATENT DOCUMENTS

| 1,015,358 | 1/1912 | Suess | 251/292 |
| 3,540,481 | 11/1970 | Peters | 137/797 |
| 3,971,402 | 7/1976 | Gallo | 137/382 |
| 4,051,866 | 10/1977 | Bake | 137/797 X |
| 4,072,161 | 2/1978 | Schoeneweis | 251/315 X |

Primary Examiner—Harold W. Weakley
Attorney, Agent, or Firm—Daniel Rubin

[57] ABSTRACT

The operating stem of a rotary valve is rotationally displaced via a detachable valve cap mounted on the stem and to which rotational operating torque is applied. Depending internally from the cap into a rotational interfit with slots provided on a stem lug are a pair of frangible shear pins adapted to shear off and prevent valve damage in response to excessive rotational torque exerted against the cap.

5 Claims, 3 Drawing Figures

FRANGIBLE VALVE STEM ASSEMBLY FOR ROTARY VALVE

TECHNICAL FIELD

The technical field to which the invention pertains comprises the field of fluid handling as related to rotary valves therefor having frangible element control.

BACKGROUND OF THE INVENTION

In a rotary-type valve such as a ball valve, plug valve, butterfly valve, etc. a stem is rotated for operating the closure member between open and closed positions. It is known in such valves to employ a frangible element such as a shear pin adapted to fail and prevent excessive torque from being transmitted to the valve mechanism. Exemplifying the use of shear pins in a rotary valve are the disclosures of U.S. Pat. Nos. 3,701,362; 4,072,161; and 4,141,538.

Characteristically, when failure of the shear pin occurs in such prior art constructions, it is necessary to drive out the separated pin pieces and insert a new pin to restore the valve to its operational condition. Even where the underlying cause of overtorque may dissipate without servicing the valve or where the cause stems from a weakness in the pin itself, this prior art procedure requires on-hands access to the valve per se for driving out the pin pieces. Many times, however, there are instances in which such valves are installed underground in a pit, valve box or the like, for which on-hands access to restore the frangible pin is most difficult and some times virtually impossible without extensive excavation or whatever. Needless to say, delayed inability to operate the valve under those circumstances, particularly when the valve is used to control utility services such as gas or water, represents not only an inconvenience and/or major expense, but a potential hazard as well.

Despite recognition of the foregoing, it has not heretofore been known how to overcome the frangible element replacement problem for valves utilized in underground service.

SUMMARY OF THE INVENTION

This invention relates to frangible valve stem assemblies for a rotary valve and more specifically to such an assembly not requiring on-hands access to the valve for restoring it to operation after failure of the frangible element occurs from a condition not attributed to a defect or interference associated with the valve itself. This is achieved in accordance with the invention by utilizing a detachable valve cap mounted on the stem and to which rotational operating torque is applied for operating the valve. Depending inward of the cap into a rotational interfit with slots provided on a stem lug are a pair of integral shear pins adapted to shear and prevent valve damage in response to excessive rotational torque exerted against the cap. Should shear pin failure occur, the cap can be readily removed by use of a commercially available jaw-type puller tool inserted through the valve box enclosure normally provided thereat, and then replaced with a valve cap that is completely functional. Since the valve cap can be replaced in a manner of minutes, as compared to the difficulty of obtaining on-hands access in accordance with the prior art, the invention hereof affords a significant time saving, as well as cost saving solution to a long standing problem. Moreover, even where on-hands valve access is required because of the underlying factor which caused failure to occur, the replaceable cap of the invention provides a simpler and more time saving approach to replacing the frangible element than previously possible.

It is therefore an object of the invention to afford a novel frangible valve stem assembly for a rotary valve.

It is a further object of the invention to effect the above recited object with a novel assembly particularly suitable for underground valve installations.

Figure 1:
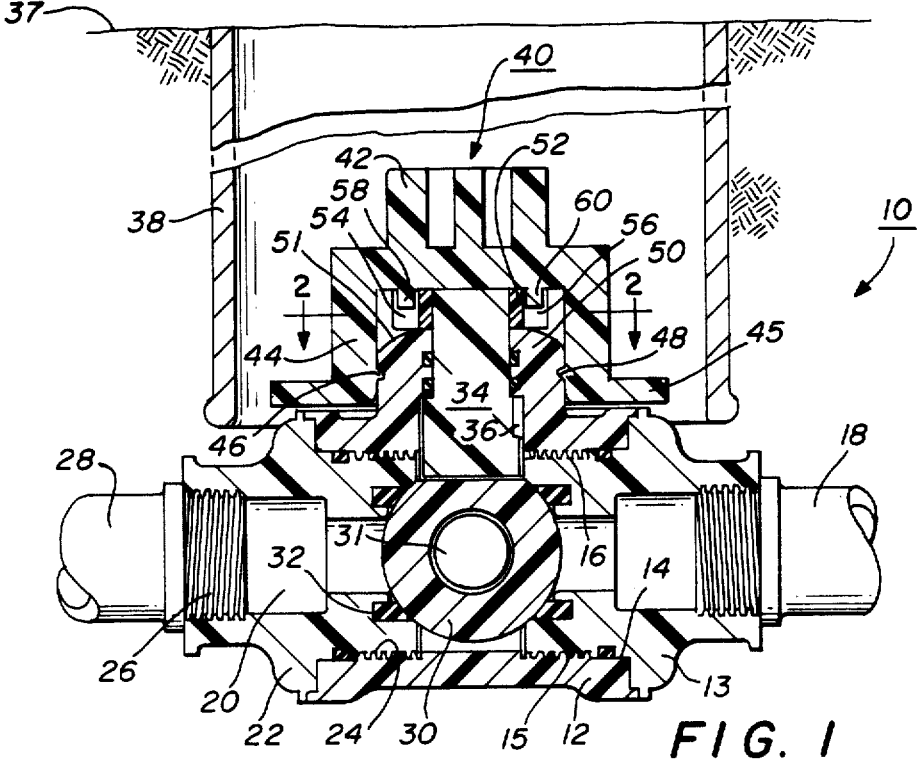
FIG. 1 is a sectional view vertically through a ball valve in its closed position containing the frangible valve stem assembly of the invention.
Figure 2:
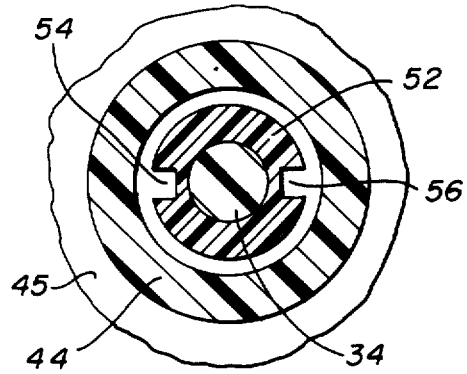
FIG. 2 is a sectional view as seen substantially along the lines 2—2 of FIG. 1.

Referring now to the drawings, there is disclosed a main and curb valve designated 10 of a commercially available type but incorporating the invention hereof as will be described. The valve is comprised generally of an all plastic composition that includes a body 12 constructed, for example, of glass filled nylon containing an inlet connector 13 secured via threads 15 and having inlet 14 threaded at 16 to receive a connecting pipe 18. At the opposite side of body 12 there is provided an outlet 20 formed in an outlet connector 22 threaded into the body via threads 24, and including threads 26 for connecting an outlet pipe 28. For opening and closing the flow passage between pipes 18 and 28 to fluid flow there is provided a ball closure element 30 constructed, for example, of acetate co-polymer having a central thru-bore 31. Ball 30 cooperates with seat 32 in a well known manner and is rotatable via stem 34 through a 90 degree arc defined at one end by stop 36.

Valve 10, for purposes of disclosure hereof, is illustrated in an underground installation below ground level 37 in which operating access is provided from the ground surface by means of a valve box 38. For operating the valve in this arrangement there is provided a nut cap 40 of composition similar to body 12 that includes a wrench engaging end 42 and a skirted periphery 44 merging with a radial flange 45. On the inside face of skirt 44 there is provided a U-shaped annular protuberance 46 adapted to seat in a U-shaped annular groove 48 on the outer periphery of body neck 50 which includes a downwardly tapered top surface 51 extending at about a 15 degree falloff from its central portion to the periphery thereof for reasons as will be described.

To effect a rotational interlock between cap 40 and stem 34, there is secured to the stem by ultrasonic welding, mechanical interlock, or the like a stem lug 52 that includes oppositely located vertical slots 54 and 56. Adapted to be received within the stem lug slots are shear pins 58 and 60, depending therein from an integral extension with the underside of cap 40. The shear pins are designed to transmit values of rotational torque on the order of about 0 to 35 ft/lbs. calculated to be encountered during normal valve operation, and are intended to shear off in the manner of FIG. 3 in the event excessive rotational torque is encountered.

Figure 3:
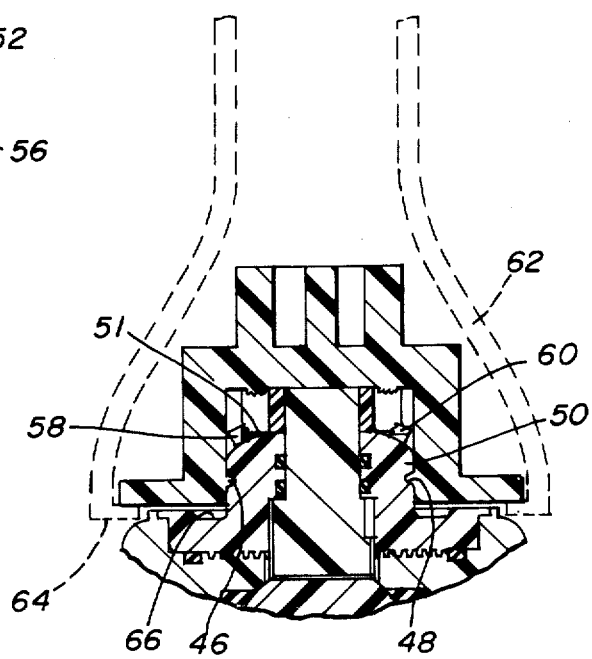
FIG. 3 is a fragmentary view similar to FIG. 1 illustrating post wear removal of a destructed valve cap.

Normal operation of the valve is effected by means of an elongated socket wrench of sorts (not shown) inserted down from the ground surface through valve box 38 to engage nut 42. Rotation of the nut through a 90 degree arc displaces ball 30 via the foregoing rotational interlock between the open and closed position of the valve. Should excess torque be encountered in attempting to operate the valve between open and closed position for whatever reason whether it be freezeup, content interference, general seizure, etc., damage to the valve from increasing the applied rotational torque is prevented via a shearing action encountered by the pins 58 and 60 as illustrated in FIG. 3. Once the pins have sheared and drop onto surface 51, cap 40 is essentially destroyed for all intended purposes. Rather than having to excavate to reach the valve for replacing the cap, a puller tool 62 shown in phantom in FIG. 3 is extended down through box 38 until its lower turned inward feet 64 engage the underside of skirt flange 45. When pulled upward the tool will force protuberance 46 to disengage from groove 48 enabling ready removal of the cap, after which a replacement cap can be installed.

To minimize the possibility of replacement interference from the remaining sheared off remnants of pins 58 and 60, they are adapted to fall onto downward sloped surface 51 and fall away therefrom when the destroyed cap 40 is removed into body pocket 66 below flange 45. In this arrangement, on-hands access to the valve with associated excavation and the like may be unnecessary. Of course, should whatever factor responsible for requiring application of the excess torque persist, on-hands access to the valve may be required notwithstanding, while even under those circumstances pin replacement is substantially easier as compared to similar purpose constructions of the prior art.

By the above description there is disclosed a novel construction for a frangible valve stem assembly particularly adapted for valves utilized in underground installations such as water or gas service in public utility underground distribution lines. By means of the invention hereof in which the shear pins are contained in a removable cap, on-hands access to the valve in the event of pin failure is not required unless the underlying cause contributing to the application of excess torque persists. In many cases, the cause of excess torque can be temporary such as an icing condition, shear pin wear or weakening of its ability to withstand normally applied torques values such that the ability to retain the frangible feature, while being able to replace the cap without the need for excavation or the like affords a substantial advantage over the similar purpose features afforded by the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a rotary valve including a body defining a fluid passage between an inlet and an outlet, a closure member within said passage and operably rotatable via a stem extending exterior of said body between a first position opening said passage to fluid flow and a second position closing said passage to fluid flow, the improvement comprising said stem having means defining spaced apart slotted apertures along opposite sides and cap means adapted to cooperate with said stem in a rotational interlock for transmitting rotational torque applied to said cap to said stem for operating said closure member between said first and second positions, said cap means containing frangible means comprising shear pins extending from a surface of said cap into an interfitting relation within said stem slots for effecting said interlock and operative to prevent excess rotational torque applied to said cap from being transmitted to said stem.

2. In a rotary valve according to claim 1 in which said shear pins depend downward from an undersurface of said cap into said slots.

3. In a rotary valve according to claim 2 in which said cap is comprised of a polymer plastic composition, and said shear pins extend integral from an internal body surface of said cap.

4. In a rotary valve according to claim 3 in which said slotted apertures extend in a direction generally parallel to the axis of said stem, and said body includes a canted surface spaced from said apertures and in communication therewith to receive the sheared portions of said shear pins.

5. In a rotary valve according to claim 4 in which said cap includes a skirt portion extending in surrounding relation to a neck portion of said body, and there is provided a protuberance extending between the opposing surfaces of said skirt and said body neck from a support on one surface into a groove in the opposite surface for defining a seating relation therebetween.

* * * * *